United States Patent [19]

Takemura

[11] Patent Number: 4,831,453
[45] Date of Patent: May 16, 1989

[54] SOLID-STATE IMAGING DEVICE HAVING HIGH-SPEED SHUTTER FUNCTION AND METHOD OF REALIZING HIGH-SPEED FUNCTION IN SOLID-STATE IMAGING DEVICE

[75] Inventor: Yasuo Takemura, Tokyo, Japan

[73] Assignee: Kabushiki Kaisha Toshiba, Kawasaski, Japan

[21] Appl. No.: 179,544

[22] Filed: Apr. 8, 1988

[30] Foreign Application Priority Data

Apr. 10, 1987 [JP] Japan .................................. 62-88174
Apr. 10, 1987 [JP] Japan .................................. 62-88176

[51] Int. Cl.$^4$ .......................... H04N 3/15; H04N 3/14
[52] U.S. Cl. .......................... 358/213.19; 358/213.22; 358/213.23
[58] Field of Search .................. 358/213.19, 213.22, 358/213.26, 909, 228, 213.29, 213.23, 213.25

[56] References Cited

U.S. PATENT DOCUMENTS

| 3,777,061 | 12/1973 | Takemura ........................ 358/213.22 |
| 4,535,363 | 8/1985 | Harada et al. .................... 358/909 |
| 4,539,596 | 9/1985 | Elabd ............................... 358/213.24 |
| 4,577,115 | 3/1986 | Rentsch et al. ................... 358/213.25 |
| 4,731,656 | 3/1988 | Dischert et al. ................. 358/213.26 |
| 4,761,689 | 11/1986 | Takatsu et al. .................. 358/213.31 |

FOREIGN PATENT DOCUMENTS

| 57-104377 | 6/1982 | Japan . |
| 58-121873 | 7/1983 | Japan . |
| 59-80069 | 5/1984 | Japan . |
| 59-181878 | 10/1984 | Japan . |

OTHER PUBLICATIONS

Background Art Information (Statement from Japanese Client) showing relevance.
Kuroda et al., A New Configuration of CCD Imager with a Very Low Smear Level, 12/1981, pp. 319–320, Electronic Device Letters, vol. EDL-2, No. 12.
Japanese Article, Horii et al., FIT–CCD Image Sensor, Semiconductor Laboratory, Matsushita Electronics Corp., ITEJ Technical Report, vol. 10, No. 52, pp. 19–24.

Primary Examiner—Jin F. Ng
Assistant Examiner—Mehdi Haghani
Attorney, Agent, or Firm—Cushman, Darby & Cushman

[57] ABSTRACT

Storage charges held in a photosensitive section of a CCD, serving as a solid-state imaging device, are discharged in response to a discharge field shift pulse supplied from a driver. When a first signal read field shift pulse is supplied from the driver, storage charges held in the photosensitive section are simultaneously transferred to a high-speed transfer section, and then transferred from the high-speed transfer section to a field memory, in units of lines and at a high speed. When a second signal read field shift pulse is supplied from the driver, storage charges held in the photosensitive section are simultaneously transferred to the high-speed transfer section. The charges stored in the field memory are transferred, in units of liens, by a line transfer section, whereby a video signal of an odd-numbered filed is obtained. Subsequently, the charges stored in the high-speed transfer section are transferred, in units of liens and at a high speed, to the field memory, from which they are then transferred, in units of liens, by the line transfer section, whereby a video signal of an even-numbered field is obtained.

15 Claims, 9 Drawing Sheets

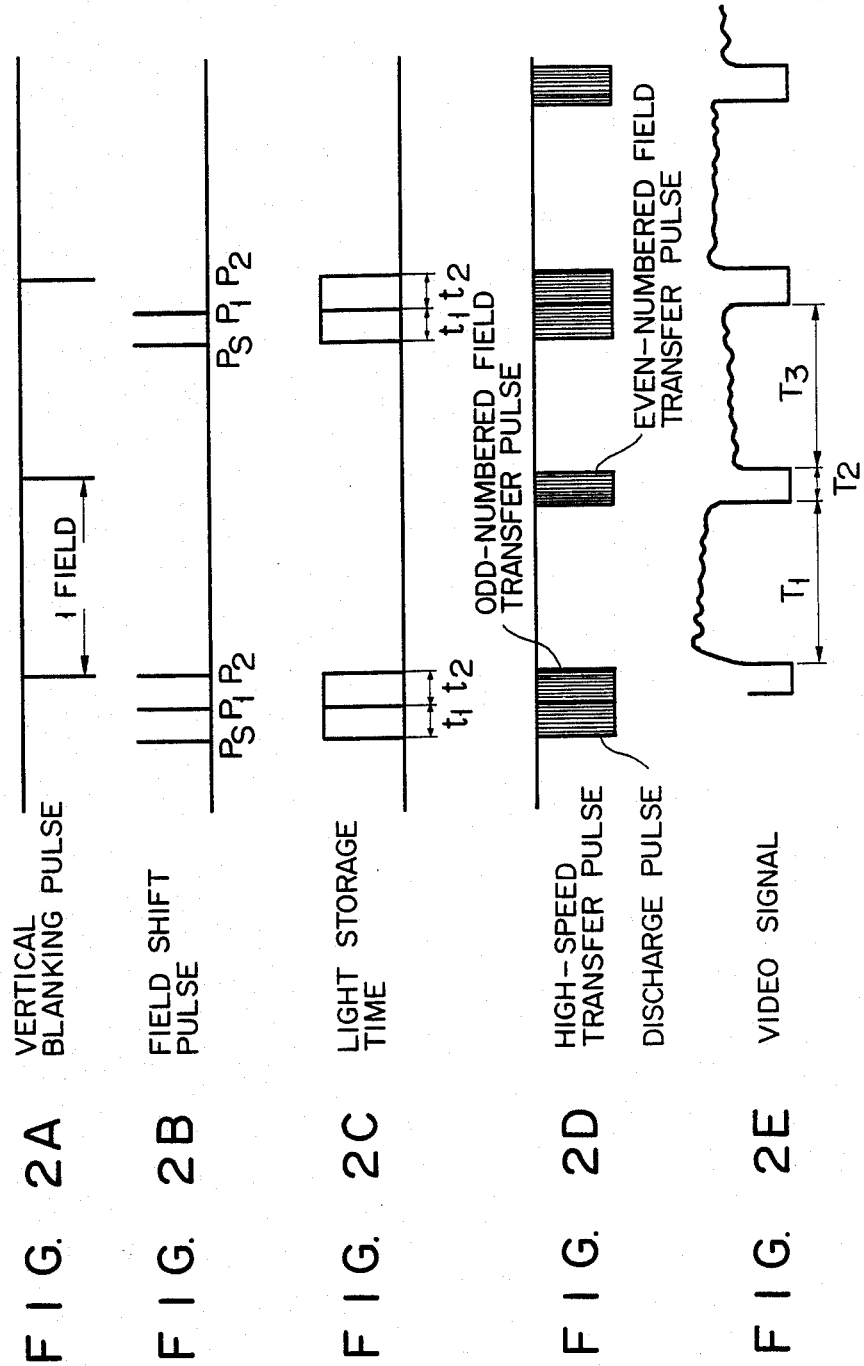

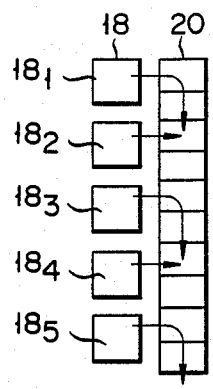
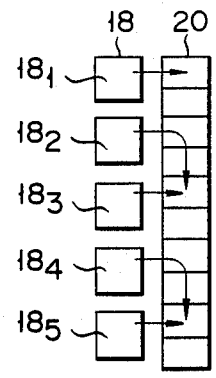
F I G. 3A    F I G. 3B
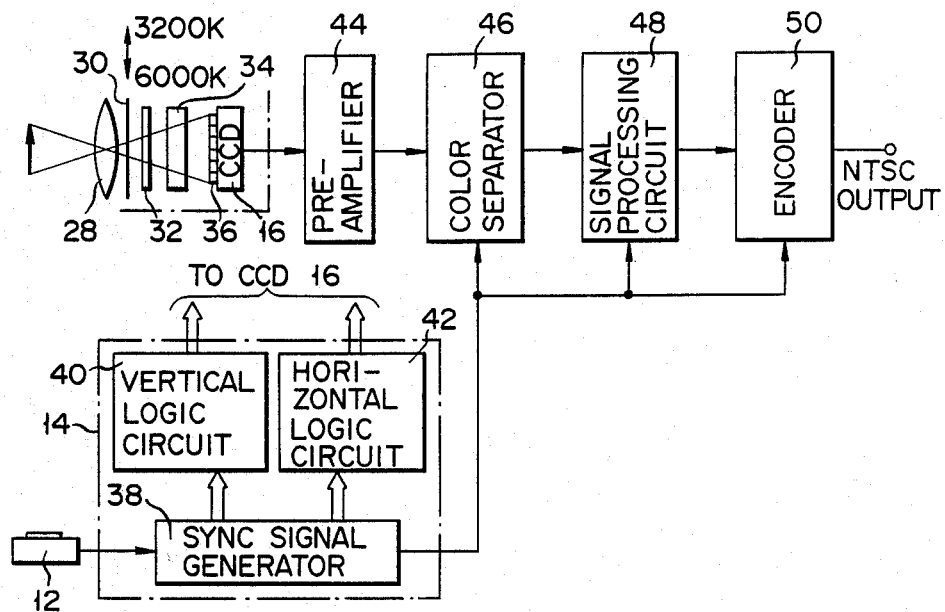
F I G. 4

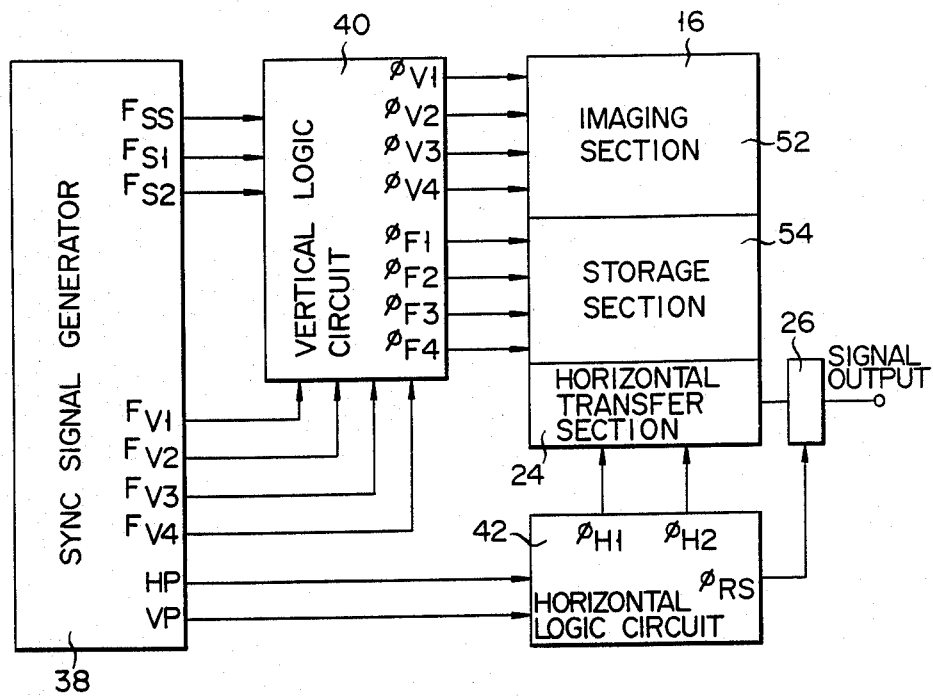
FIG. 5
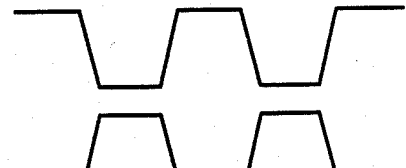
FIG. 6A  $\phi_{H1}$
FIG. 6B  $\phi_{H2}$
FIG. 6C  $\phi_{RS}$
FIG. 6D
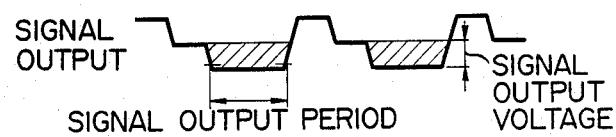

FIG. 7A VERTICAL BLANKING PULSE
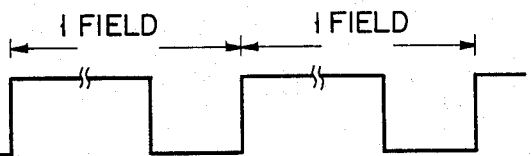
FIG. 7B FIELD PULSE
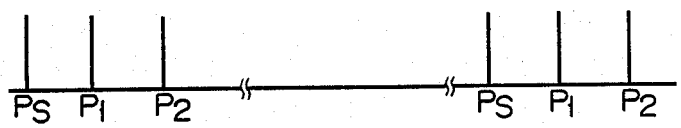
FIG. 7C $\phi_V$
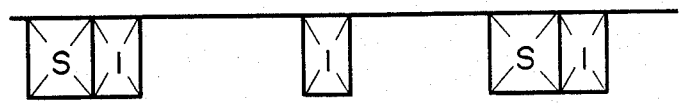
FIG. 7D $\phi_F$
FIG. 10
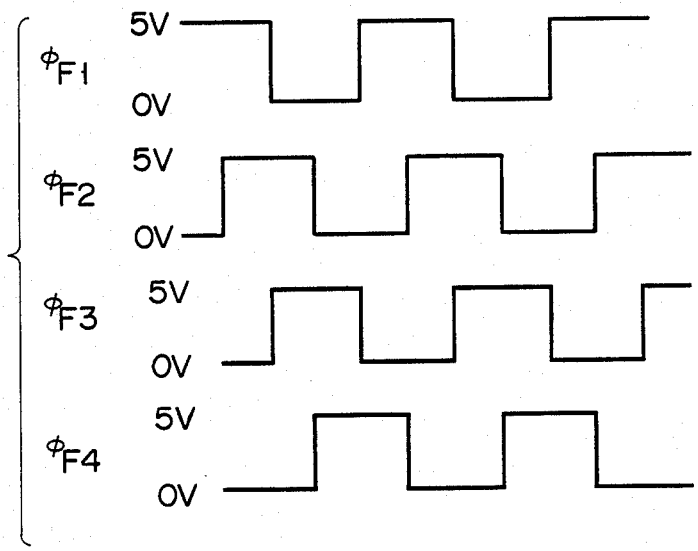

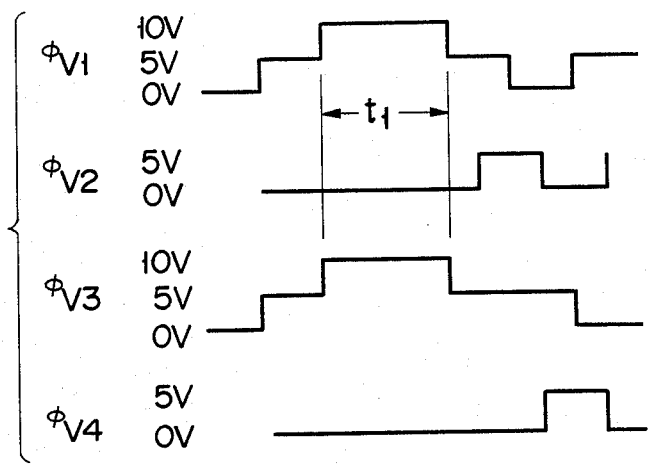
F I G. 11A
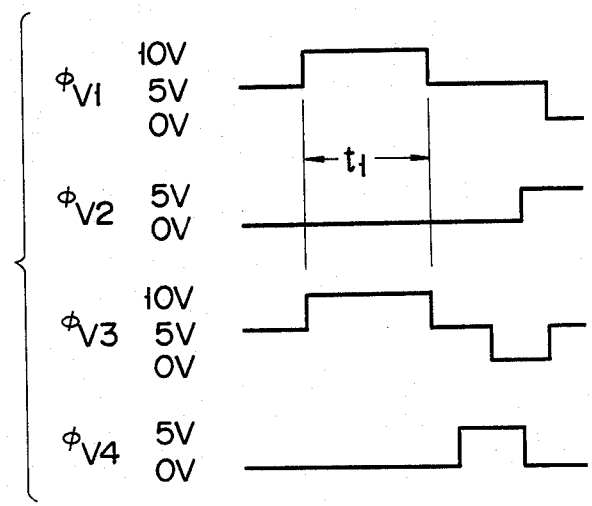
F I G. 11B

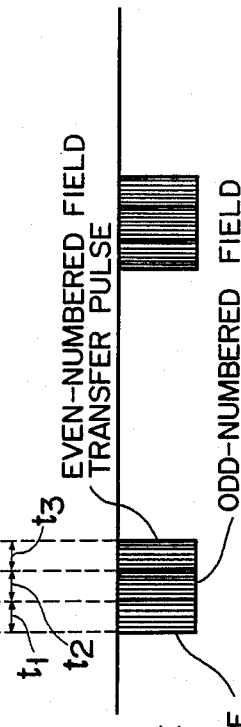
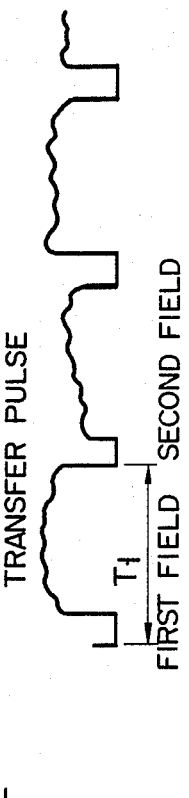
FIG. 13A  VERTICAL BLANKING PULSE
FIG. 13B  FIELD SHIFT PULSE
FIG. 13C  LIGHT STORAGE TIME
FIG. 13D  HIGH-SPEED TRANSFER PULSE / DISCHARGE PULSE
FIG. 13E  VIDEO SIGNAL

SOLID-STATE IMAGING DEVICE HAVING HIGH-SPEED SHUTTER FUNCTION AND METHOD OF REALIZING HIGH-SPEED FUNCTION IN SOLID-STATE IMAGING DEVICE

BACKGROUND OF THE INVENTION

1. Field of the Invention

The present invention relates to a solid-state imaging device such as a charge-coupled device (CCD) and, more particularly, to a solid-state imaging device having a high-speed shutter function and a method of realizing the high-speed function in the solid-state imaging device.

2. Description of the Related Art

A solid-state imaging device such as a CCD is a comparatively recent development, and a color video camera incorporating this device is now commercially available. In this color video camera, the charge storage time of the photosensitive section of the device corresponds to the shutter time of a still photography camera, and is normally set to 1/60 sec.

In the meantime, however, a frame interline transfer (FIT) type CCD has been developed, which allows arbitrary selection of the shutter speed. A typical FIT type CCD comprises photosensitive and high-speed vertical transfer sections which constitute an imaging section, a field memory which serves as a storage section, and a horizontal transfer section. This type of CCD operates in the following manner:

(a) Charges stored in the photosensitive section are simultaneously transferred to the high-speed transfer section in response to a discharge field shift pulse supplied from a driver. A high-speed clock pulse is then supplied from the driver to the high-speed transfer section, and the charges are discharged at a high speed.

(b) Next, charges stored in the photosensitive section are simultaneously transferred to the high-speed transfer section in response to a signal read field shift pulse supplied from the driver, and are then transferred to the field memory in units of lines and at a high speed. Thereafter, the charges in the field memory are transferred to the horizontal transfer section, again in units of lines but at a normal television frequency, where they are then read within one horizontal period.

Thus, according to the conventional FIT type CCD, the charges in the photosensitive section are shifted in response to the discharge field shift pulse, after which the charges read in response to the signal read field shift pulse are stored in the storage section. Therefore, the time interval between the discharge and signal read field shift pulses constitutes the shutter speed. By selecting this time interval, a specified shutter speed can be set.

In the conventional video camera using the FIT type CCD, a one-field image can be obtained by a high-speed shutter operation. However, if a two-field (i.e., one-frame) image constituted by odd- and even-numbered fields is obtained so as to improve the vertical resolution, two shutter operations are required. If two shutter operations are performed in the above-described camera, the time interval between first and second shutter operations is 1/60 sec. Accordingly, although the one-field image can be obtained by the high-speed operation, the one-frame image corresponds to an image obtained by repeating the high-speed operation twice at a time interval of 1/60 sec. Therefore, when the motion of an object to be imaged is fast, flicker is caused and the resultant image becomes poor.

SUMMARY OF THE INVENTION

It is, therefore, an object of the present invention to provide a solid-state imaging device the shutter of which can operate at high-speed, so that one-frame images of excellent vertical resolution can be obtained, which are free from flicker even when the object being imaged is in rapid motion, another object of the present invention being to provide a method of realizing the above.

More specifically, a solid-state imaging device having high-speed shutter function according to one aspect of the present invention comprises: a photosensitive section for storing charges corresponding to an amount of received light and a period of time during which the light is received; a high-speed transfer section to which the charges stored in the photosensitive section are simultaneously transferred in response to field shift pulses which include a discharge field shift pulse and first and second signal reading field shift pulses; a field memory to which are transferred, in units of lines and at a high speed, the charges transferred to the high-speed transfer section, the field memory storing the transferred charges; a line transfer section to which the charges stored in the field memory are transferred in unit of lines; and driver means for successively generating the discharge field shift pulse, and the first and second signal read field shift pulses at equal time intervals for one shutter operation, such that a light storage time in the photosensitive section, between generation of the discharge field shift pulse and generation of the first signal read field shift pulse, coincides with a light storage time, also in the photosensitive section, between generation of the first signal read field shift pulse and generation of the second signal read field shift pulse.

A solid-state imaging device having a high-speed shutter function according to another aspect of the invention comprises: a photosensitive section for storing charges corresponding to an amount of received light and a period of time during which the light is received; a high-speed transfer section to which the charges stored in the photosensitive section are simultaneously transferred in response to field shift pulses which include a discharge field shift pulse and first and second signal read field shift pulses; a first field memory to which are transferred, in units of lines and at a high speed, the charges transferred to the high-speed transfer section, the first field memory storing the transferred charges; a second field memory to which the charges stored in the first field memory are transferred in units of lines and at a high speed, the second field memory storing the transferred charges; a line transfer section to which the charges stored in the second field memory are transferred in units of lines; and driver means for generating a drive pulse for causing the high-speed transfer section to transfer to the field memory, in units of lines, the charges transferred to the high-speed transfer section, and for successively generating the discharge field shift pulse, and the first and second signal read field shift pulses at equal time intervals for one shutter operation, such that a light storage time in the photosensitive section, between generation of the discharge field shift pulse and generation of the first signal read field shift pulse, coincides with a light storage time, also in the photosensitive section, between generation of the first signal read field shift pulse and generation of the second signal read field shift pulse, the signal which corresponds to a one-field in the high-speed transfer section being transferred to each of the first and second field memories, in accordance with the drive pulse between the first and second signal read field shift pulses, and the drive pulse supplied immediately after the second signal read field shift pulse.

A method of realizing a high-speed shutter function in a solid-state imaging device according to the present invention comprises: a first step of supplying a discharge field shift pulse for discharging charges stored in accordance with an amount of received light and a period of time during which the light is received; a second step of supplying a first signal read field shift pulse; a third step of storing charges, which are stored after the first step, in a first storage means, in response to the first signal read field shift pulse; a fourth step of supplying a second signal read field shift pulse, the second signal read field shift pulse being supplied at a timing such that a time interval between supply of the discharge field shift pulse and supply of the first signal read field shift pulse coincides with a time interval between supply of the first signal read field shift pulse and supply of the second signal read field shift pulse; a fifth step of storing charges, which are stored after the third step, in a second storage means, in response to the second signal read field shift pulse; a sixth step of transferring the charges, which are stored in the first storage means in the third step, in units of lines; a seventh step of storing, in the first storage means, upon completion of the sixth step, the charges which were stored in the second storage means in the fifth step; and an eighth step of transferring, in units of lines, the charges which were stored in the first storage means in the seventh step, the first to eighth steps being performed in a one-frame period.

BRIEF DESCRIPTION OF THE DRAWINGS

FIGS. 2A to 2E are timing charts for explaining operations of the solid-state imaging device and its driver, as shown in FIG. 1;

FIGS. 3A and 3B are views, respectively, for explaining a method of adding images of first and second fields to each other;

FIG. 4 is a view showing an arrangement of a color video camera in which the embodiment of the present invention is incorporated;

FIG. 5 is a block diagram of the driver;

FIGS. 6A to 6D are timing charts for explaining operations of a horizontal logic circuit contained in the driver;

FIGS. 7A to 7D, and FIGS. 8 to 10 are timing charts, respectively, for explaining operations of a vertical logic circuit contained in the driver;

FIGS. 11A and 11B are timing charts, respectively, for explaining operations for applying field shift pulses;

FIGS. 13A to 13E are timing charts for explaining operations of the solid-state imaging device and its driver, as shown in FIG. 12.

DETAILED DESCRIPTION OF THE PREFERRED EMBODIMENTS

Figure 1:
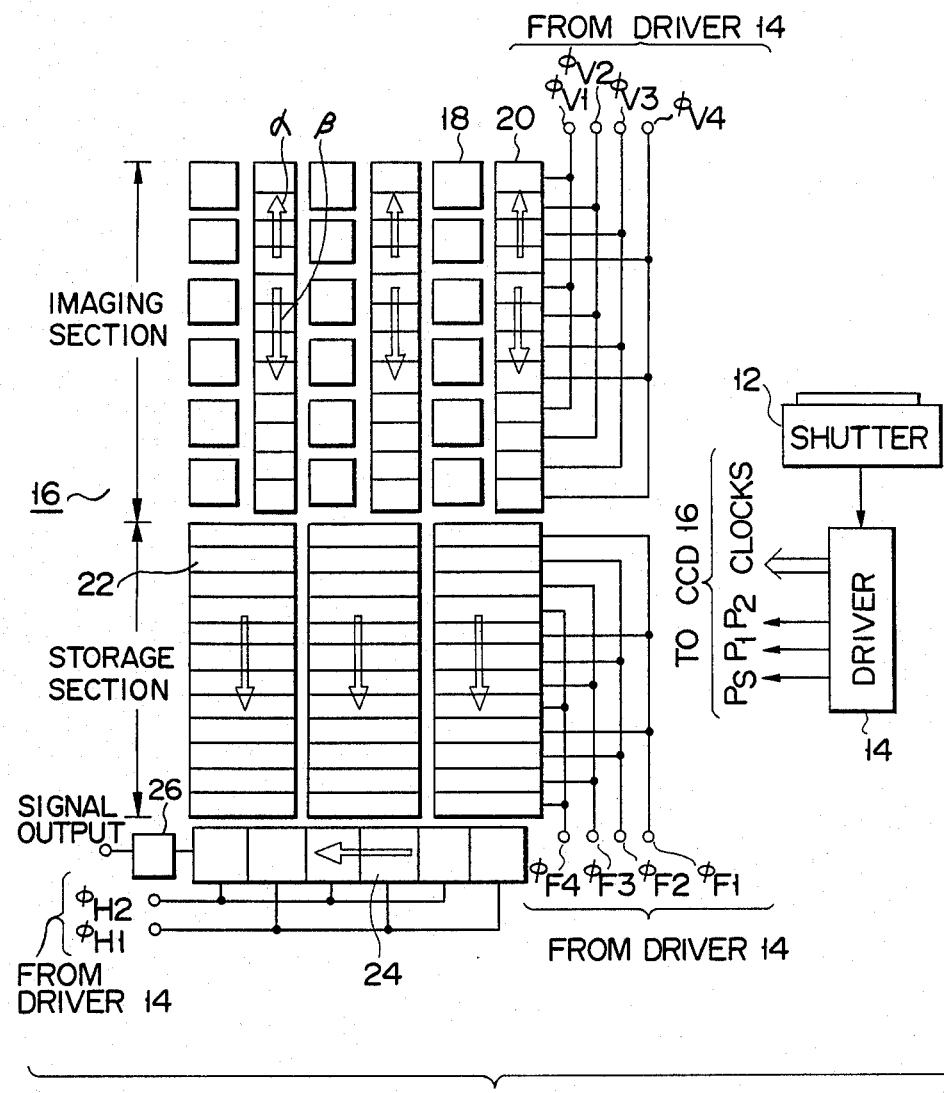
FIG. 1 is a view showing an arrangement of a solid-state imaging device according to an embodiment of the present invention, together with its driver.

FIG. 1 shows an arrangement of an embodiment of the present invention. FIGS. 2A to 2E are timing charts for explaining operations of the embodiment. When shutter 12 for photographing is operated, driver 14 successively generates discharge field shift pulse $P_s$ and first and second signal read field shift pulses $P_1$ and $P_2$ for one photographing operation, and supplies them to CCD 16 serving as a solid-state imaging device. Time intervals for supplying field shift pulses $P_s$, $P_1$, and $P_2$ are set to be equal. CCD 16 is of an interline transfer type, and is periodically operated in a normal operation mode in accordance with vertical blanking pulses. CCD 16 comprises photosensitive and vertical high-speed transfer sections 18 and 20 constituting an imaging section, field memory 22 as a storage section, horizontal transfer section 24, and output circuit 26. Photosensitive section 18 includes, e.g., 500 vertical and 200 horizontal pixels (photodiodes).

In CCD 16, a gate (not shown) arranged between photosensitive section 18 and high-speed transfer section 20 is enabled in response to first discharge field shift pulse $P_s$. As a result, charges in photosensitive section 18 are simultaneously transferred to high-speed transfer section 20. The charges in high-speed transfer section 20 are discharged upward in a direction indicated by arrow a in FIG. 1 at a high speed during period $t_1$ in accordance with clocks ($\phi_{V1}$, $\phi_{V2}$, $\phi_{V3}$, and $\phi_{V4}$) supplied from driver 14. During this period, image charges are stored in photosensitive section 18.

Then, first signal read field shift pulse $P_1$ is output from driver 14. In response to field shift pulse $P_1$, signal electric charges of odd- and even-numbered pixels in photosensitive section 18 are added to each other, and the resultant charges are transferred to high-speed transfer section 20. The charges transferred to high-speed transfer section 20 are transferred downward in a direction indicated by arrow $\beta$ in FIG. 1, i.e., transferred to field memory 22 at a high speed within period $t_2$. The next image charges are stored in photosensitive section 18 during period $t_2$.

Subsequently, second signal read field shift pulse $P_2$ is supplied from driver 14. In response to this pulse, signal charges of the next field, i.e., of even- and odd-numbered pixels are added to each other. The resultant charges are simultaneously transferred to high-speed transfer section 20.

FIGS. 3A and 3B are views for explaining a method of adding images of the first and second field to each other. As shown in FIG. 3A, signals of odd- and even-numbered pixels in photosensitive section 18 are added to each other in response to first signal read field shift pulse $P_1$. More specifically, sum signals corresponding to charges of pixels $18_1+18_2$, $18_3+18_4$, ..., are stored in high-speed transfer section 20. In response to second signal read field shift pulse $P_2$, signals of even- and odd-numbered pixels in photosensitive section 18 are added to each other, as shown in FIG. 3B. More specifically, sum signals corresponding to charges of pixels $18_2+18_3$, $18_4+18_5$, ..., are stored in high-speed transfer section 20.

With the above operation, image charges of the first and second fields are respectively present in field memory 22 and high-speed transfer section 20.

In this state, the image of the first field is read during period $T_1$ through horizontal transfer section 24 in a manner similar to a normal television scanning operation, and the image charges of the second field are transferred to field memory 22 at a high speed during period $T_2$. Then, the image of the second field is read through horizontal transfer section 24 during period $T_3$ in a manner similar to a normal television scanning operation, thereby obtaining a one-frame image. The image includes signals of the first (odd-numbered) field, and signals of the second (even-numbered) field. The signals of the respective fields are obtained at equal shutter intervals. In addition, a time lag between the first and second fields is very small, as shown in FIG. 2C. As a result, according to a video camera using CCD 16 and driver 14, the vertical resolution can be improved, and flicker due to the time lag between the fields can be prevented. Moreover, a shutter time, i.e., a shutter speed can be arbitrarily set by adjusting the time intervals between field shift pulses $P_s$, $P_1$, and $P_2$.

In high-speed transfer section 20, transfer is performed using a 2-MHz clock pulse. Charges of 250 vertical pixels can be transferred within 125 µs. Therefore, the maximum shutter speed for obtaining a one-frame image is:

$$t_1 + t_2 = 125 + 125 = 250 \, \mu s.$$

FIG. 4 shows an arrangement of a color video camera using a solid-state imaging device according to the present invention. Light passes through zoom lens 28 of 3× magnification is focused onto the imaging section in CCD 16 serving as a solid-state imaging device with color filter array 36 through color temperature converting filter 30, color correction filter 32, and optical low-pass filter (LPF) 34.

Driver 14 includes sync signal generator 38, vertical logic circuit 40, and horizontal logic circuit 42. Vertical and horizontal logic circuits 40 and 42 generate various pulses necessary for the operation of CCD 16 using various types of pulse signals supplied from sync signal generator 38, and supplies them to CCD 16.

An output signal from CCD 16 is amplified by preamplifier 44, and then separated by color separator 46 into three primary color signals, namely the red (R), green (G), and blue (B) signals. These primary color signals are subjected to signal processing required for a normal color camera such as gamma correction and white clip in signal processing circuit 48, and then supplied to encoder 50. Encoder 50 generates luminance and chrominance signals from the input signals, and mixes them to generate and output a standard NTSC signal.

A method of driving CCD 16 will be described with reference to FIG. 5. Sync signal generator 38 generates timing pulses ($F_{Ss}$, $F_{S1}$, $F_{S2}$, $F_{V1}$, $F_{V2}$, $F_{V3}$, $F_{V4}$, HP, and VP) necessary for the vertical and horizontal drive operations, and supplies them to vertical and horizontal logic circuits 40 and 42. Vertical logic circuit 40 generates each pulse waveform ($\phi_{V1}$, $\phi_{V2}$, $\phi_{V3}$, $\phi_{V4}$, $\phi_{F1}$, $\phi_{F2}$, $\phi_{F3}$, and $\phi_{F4}$) necessary for vertical transfer operations in imaging and storage sections 52 and 54 in CCD 16. Horizontal logic circuit 42 generates each pulse waveform ($\phi_{H1}$, $\phi_{H2}$, and $\phi_{RS}$) necessary for horizontal transfer. The waveforms necessary for horizontal transfer are two-phase drive waveforms ($\phi_{H1}$ and $\phi_{H2}$) shown in FIGS. 6A and 6B, and a reset pulse waveform ($\phi_{RS}$) shown in FIG. 6C to be supplied to output circuit 26. By supplying these pulse waveforms to horizontal transfer section 24 and output circuit 26, signals come downward from storage section 54 in units of lines are horizontally transferred, and a signal waveform shown in FIG. 6D can be obtained from output circuit 26.

Figure 8:
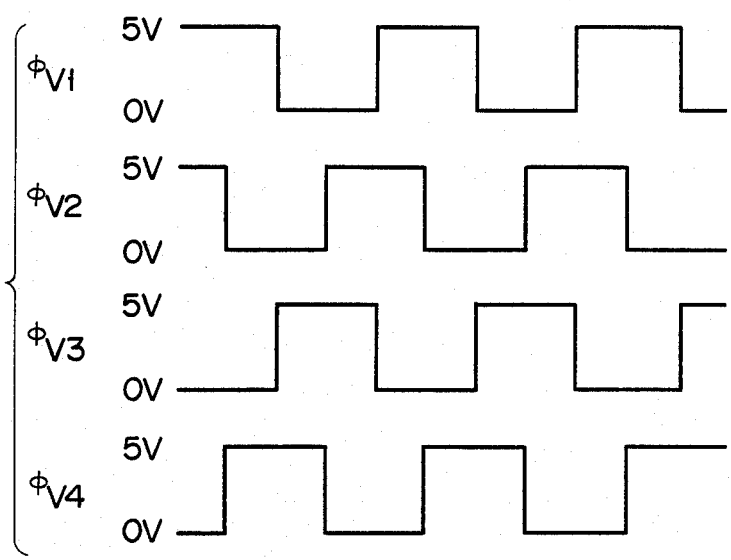
Figure 9:
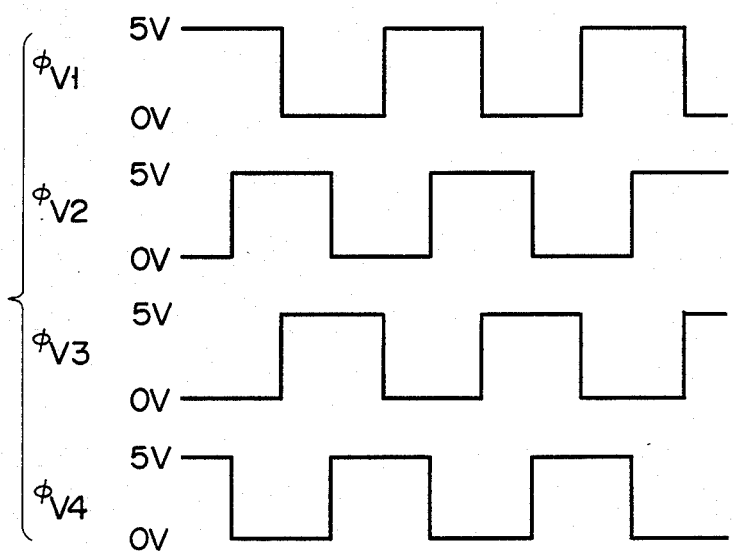

An operation of vertical logic circuit 40 will be described with reference to FIGS. 7A to 7D, and FIGS. 8 to 10. Waveform $\phi V$ shown in FIG. 7C is equivalent to each of pulse waveforms $\phi_{V1}$, $\phi_{V2}$, $\phi_{V3}$, and $\phi_{V4}$ supplied to imaging section 52. In FIG. 7A, reference symbol S denotes a discharge period, in which four-phase pulse waveforms shown in FIG. 8 are output. Reference symbol I denotes a transfer period of signals, in which four-phase pulse waveforms shown in FIG. 9 are output. In addition, waveform $\phi F$ shown in FIG. 7D is equivalent to each of pulse waveforms $\phi_{F1}$, $\phi_{F2}$, $\phi_{F3}$, and $\phi_{F4}$. In FIG. 7D, four-phase pulse waveforms shown in FIG. 10 are output in a period denoted by reference symbol I.

That is, the discharge period of unnecessary charges and the transfer period of signals are present in imaging section 52. As shown in FIGS. 8 and 9, the phases of four-phase waveforms change. This determines a transfer direction, i.e., either of the upward and downward directions indicated by arrows α and β in FIG. 1.

More specifically, as shown in FIG. 8, in the discharge period of unnecessary charges, the timing of applying a voltage of 5V is sequentially shifted in the following order: $\phi_{V4} \rightarrow \phi_{V3} \rightarrow \phi_{V2} \rightarrow \phi_{V1}$. Therefore, unnecessary charges are shifted in a direction corresponding to the above order, i.e., the upward direction, and are discharged. A drain section is normally arranged in the uppermost end of imaging section 52 so that charges shifted to the drain section are dissipated.

On the other hand, as shown in FIG. 9, in the transfer period of signals, the timing of applying a voltage of 5V is shifted in the following order: $\phi_{V1} \rightarrow \phi_{V2} \rightarrow \phi_{V3} \rightarrow \phi_{V4}$. Therefore, the signal charges are shifted in a direction corresponding to the above order, and hence the signals are shifted from imaging section 52 to storage section 54.

When the signal charges in imaging section 52 are transferred at a high-speed, pulse signal $\phi F$ to be supplied to storage section 54 becomes a four-phase high-speed transfer pulse, and therefore the signal charges are taken into storage section 54 at a high speed, as shown in FIGS. 7D and FIG. 10. More specifically, as shown in FIG. 10, in accordance with the timing of applying a voltage of 5V which is shifted in the order of $\phi_{F1} \rightarrow \phi_{F2} \rightarrow \phi_{F3} \rightarrow \phi_{F4}$, the signal charges are transferred to storage section 54. Upon completion of the high-speed transfer, as shown in FIG. 7D, a one-line signal is added every 1H, and the signals are shifted from storage section 54 to horizontal transfer section 24. This operation is performed such that the four-phase waveform having one period is generated and a nonoperative state is temporarily set.

In imaging section 52, as described above, field shift pulses ($P_s$, $P_1$, and $P_2$) are supplied to enable the gate (not shown) arranged between photosensitive section 18 and high-speed transfer section 20. As a result, signals are shifted from photosensitive section 18 to high-speed transfer section 20. That is, field shift pulses $P_s$, $P_1$, and $P_2$ are required to shift the signals from photosensitive section 18 to high-speed transfer section 20. However, according to the embodiment, instead of independently arranging a gate in vertical logic circuit 40, these field shift pulses are superposed on pulse waveforms $\phi_{V1}$ and $\phi_{V3}$, and supplied from vertical logic circuit 40 to imaging section 52.

First, a case will be described, wherein an odd-numbered field is processed. As shown in FIG. 11A, when a field shift pulse of +10 V is superposed on pulse waveforms $\phi_{V1}$ and $\phi_{V3}$, the gate between photosensitive section 18 and high-speed transfer section 20 is enabled, signal charges in photosensitive section 18 are simultaneously shifted to electrodes of high-speed transfer section 20, to which pulse waveforms $\phi_{V1}$ and $\phi_{V3}$ are supplied. When pulse waveforms $\phi_{V2}$ and $\phi_{V1}$ are respectively set at +5 V and 0 V, the signal charge at the electrode to which pulse waveform $\phi_{V1}$ is supplied is shifted to an electrode to which pulse waveform $\phi_{V2}$ is supplied. At this time, since pulse waveform $\phi_{V3}$ is set at +5V, the signal charge at the electrode to which pulse waveform $\phi_{V2}$ is supplied is added to the signal charge at the electrode to which pulse waveform $\phi_{V3}$ is supplied. That is, as shown in FIG. 3A, a charge of an odd-numbered pixel in photosensitive section 18 is shifted through the electrodes to which pulse waveforms $\phi_{V1}$ and $\phi_{V2}$ are supplied and added to a signal charge of an even-numbered pixel at the electrode to which pulse waveform $\phi_{V3}$ is supplied.

In an even-numbered field, as shown in FIG. 11B, when a field shift pulse of +10 V is superposed on pulse waveforms $\phi_{V1}$ and $\phi_{V3}$, the gate between photosensitive section 18 and high-speed transfer section 20 is enabled, and signal charges in photosensitive section 18 are simultaneously shifted to electrodes of high-speed transfer section 20, to which pulse waveforms $\phi_{V1}$ and $\phi_{V3}$ are supplied. When pulse waveforms $\phi_{V4}$ and $\phi_{V3}$ are respectively set at +5 V and 0 V, the signal charge at the electrode to which pulse waveform $\phi_{V3}$ is supplied is shifted to an electrode to which pulse waveform $\phi_{V4}$ is supplied. At this time, since pulse waveform $\phi_{V1}$ is set at +5 V, the signal charge at the electrode to which pulse waveform $\phi_{V4}$ is supplied is added to the signal charge at the electrode to which pulse waveform $\phi_{V1}$ is supplied. That is, as shown in FIG. 3B, a charge of an even-numbered pixel is shifted through the electrodes to which pulse waveforms $\phi_{V3}$ and $\phi_{V4}$, and added to a signal charge of an odd-numbered pixel at the electrode to which pulse waveform $\phi_{V1}$ is supplied.

As described above, according to the present invention, a high-speed shutter operation can be performed, and a one-frame image having excellent vertical resolution can be obtained. When a signal for a still picture is obtained using a normal video camera, if an object moves, flicker is caused because a shutter is closed at an interval of 1/60 sec between odd- and even-numbered fields. For this reason, a complete one-frame image cannot be obtained. However, according to the present invention, even if the motion of an object is fast, a still image with an excellent vertical resolution can be obtained. In addition, even if a variable-speed shutter is employed, a one-frame still image can be obtained at an arbitrary speed.

In CCD 16 described above, signals of the second field are stored in high-speed transfer section 20. Therefore, it is preferable for the area of high-speed transfer section 20 to be completely shielded from light. More specifically, since a time lag is present between the period when signals of the first field are read and the period when signals of the second field are read, the signals read later are to be stored in high-speed transfer section 20 for a longer period of time corresponding to the time lag. For this reason, if this area is not completely shielded from light, a difference in a smear amount is caused. Especially, when part of a screen is irradiated with light having a higher intensity, smear is caused in the signals of the second field, thereby causing flicker and degrading image quality. Thus, it is preferable for the area of high-speed transfer section 20 to be completely shielded from light.

However, complete shielding may not be easily performed. In such as case, a field memory may be added so that the signals can be stored therein in place of high-speed transfer section 20.

Figure 12:
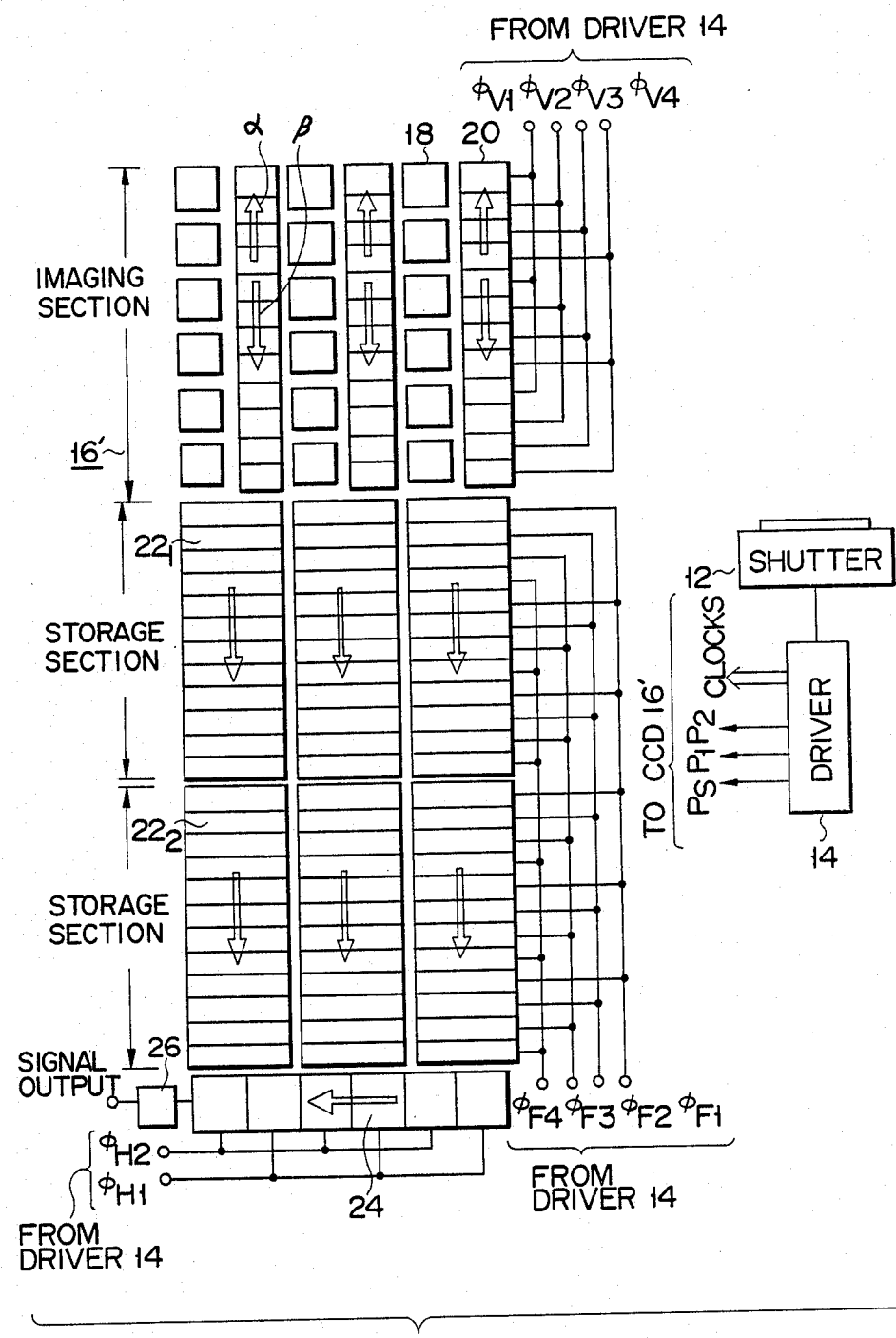
FIG. 12 is a view showing an arrangement of a solid-state imaging device according to another embodiment of the present invention, together with its driver.

FIG. 12 shows an arrangement of another embodiment related to the above case. FIGS. 13A to 13E are timing charts of the embodiment. According to this embodiment, two field memories (denoted by reference numerals $22_1$ and $22_2$ in FIG. 12) are used as a storage section. In CCD 16' with such an arrangement, charges stored in photosensitive section 18 are simultaneously transferred to high-speed transfer section 20 in response to first field shift pulse $P_S$. The charges in high-speed transfer section 20 are discharged at a high speed in a direction indicated by arrow $\alpha$ in FIG. 12 during period $t_1$ in accordance with a clock supplied from driver 14. Image charges are stored in photosensitive section 18 within this period.

Then, first signal read field shift pulse $P_1$ is output from driver 14. In response to first signal read field shift pulse $P_1$, signal charges of odd- and even-numbered pixels in photosensitive section 18 are added to each other, and the resultant signals are transferred to high-speed transfer section 20. The charges transferred to high-speed transfer section 20 are transferred in a direction indicated by arrow $\beta$ in FIG. 12, i.e., to field memory $22_1$ at a high speed within period $t_2$. Within period $t_2$, the next image charges are stored in photosensitive section 18.

Subsequently, driver 14 supplies second signal read field shift pulse $P_2$. As a result, signal charges of the next field, i.e., of even- and odd-numbered pixels, and simultaneously transferred to high-speed transfer section 20. The charges in high-speed transfer section 20 are transferred to field memory $22_1$ at a high speed within period $t_2$. At the same time, the charges which have been stored in field memory $22_1$ are transferred field memory $22_2$ of the next stage.

With the above-described operation, the image charges of the first and second fields are respectively present in field memories $22_1$ and $22_2$.

In the above state, the image (the contents in field memory $22_2$) of the first field is read in period $T_1$ through horizontal transfer section 24 in a manner similar to the normal television scanning operation. During this operation, the contents in field memory $22_1$ are transferred to field memory $22_2$. Subsequently, the image (the contents in field memory $22_2$) of the second field is read in a manner similar to the normal television scanning operation, thereby obtaining a one-frame image. This image includes the signals of the first (odd-numbered) and second (even-numbered) fields. The signals of the respective fields are obtained at equal shutter intervals. In addition, a time lag between the first and second fields is very small, as shown in FIG. 13C. As a result, according to a video camera using CCD 16', the vertical resolution can be improved, and flicker due to the time lag between the fields can be prevented. Moreover, a shutter time, i.e., a shutter speed can be arbitrarily set by adjusting the time intervals between field shift pulses $P_S$, $P_1$, and $P_2$.

This embodiment is characterized in that signals of the first and second fields are simultaneously transferred to a plurality of field memories, i.e., field memories $22_1$ and $22_2$, respectively. That is, the signals of the first and second fields are respectively transferred to the first and second field memories so as not to cause a time lag between dwelling times of the charges in high-speed transfer section 20. Thus, the field memory area is completely shielded from light, and smear can be prevented.

In the above embodiment, the two storage sections (field memories) are arranged between the imaging section and the horizontal transfer section. However, the present invention is not limited to this arrangement. For example, in FIG. 12, a pair of storage and horizontal transfer sections may be arranged on each of upper and lower portions of the imaging section. In addition, the number of storage sections is not limited to two. For example, first, second, and third storage sections may be arranged so that signals having red (R), green (G), and blue (B) color information are respectively stored in the first, second, and third storage sections. With this arrangement, the R, G, and B color image signals without smear can be obtained.

As has been described above, a high-speed shutter operation can be performed, and a one-frame image with an excellent vertical resolution can be obtained. In the normal video camera, when a signal for a still image is to be obtained and an object moves, flicker is caused because a shutter is closed at an interval of 1/60 sec between odd- and even-numbered fields. Therefore, a complete one-frame image cannot be obtained. However, according to the present invention, even when the motion of an object is fast, a still image with an excellent vertical resolution can be obtained. In addition, even if a variable-speed shutter is employed, one-frame still image can be obtained at an arbitrary speed. Moreover, differences in signal level between the fields are not produced, and hence an image signal with excellent quality can be obtained.

What is claimed is:

1. A solid-state imaging device having a high-speed shutter function, comprising:
    a photosensitive section for storing charges corresponding to an amount of received light and a period of time during which the light is received;
    a high-speed transfer section to which the charges stored in said photosensitive section are simultaneously transferred in response to field shift pulses which include a discharge field shift pulse and first and second signal read field shift pulses;
    a field memory to which is transferred, in units of lines and at a high speed, the charges transferred to said high-speed transfer section, said field memory storing the transferred charges;
    a line transfer section to which the charges stored in said field memory are transferred in unit of lines; and
    driver means for successively generating the discharge field shift pulse and the first and second signal read field shift pulses at equal time intervals for one shutter operation, such that a light storage time in said photosensitive section, between generation of the discharge field shift pulse and generation of the first signal read field shift pulse, coincides with a light storage time, also in said photosensitive section, between generation of the first signal read field shift pulse and generation of the second signal read field shift pulse.

2. The solid-state imaging device according to claim 1, wherein the discharge field shift pulse is a pulse for eliminating the charges stored in said photosensitive section, the first signal read field shift pulse is a pulse for reading a signal of a first field, and the second signal read field shift pulse is a pulse for reading a signal of a second field.

3. The solid-state imaging device according to claim 2, wherein the first field is an odd-numbered field and the second field is an even-numbered field.

4. The solid-state imaging device according to claim 2, wherein said driver means generates a drive pulse for causing said high-speed transfer section to transfer to said field memory, in units of liens, the charges which have been transferred to said high-speed transfer section, and outputs each of the field shift pulses by superposing each of the field shift pulses on the drive pulse.

5. A solid-state imaging device having a high-speed shutter function, comprising:
    a photosensitive section for storing charges corresponding to an amount of received light and a period of time during which the light is received;
    a high-speed transfer section to which the charges stored in said photosensitive section are simultaneously transferred in response to field shift pulses which include a discharge field shift pulse and first and second signal read field shift pulses;
    a first field memory to which is transferred, in units of lines and at a high speed, the charges transferred to said high-speed transfer section, said first field memory storing the transferred charges;
    a second field memory to which the charges stored in said first field memory are transferred in units of lines and at a high speed, said second field memory storing the transferred charges;
    a line transfer section to which the charges stored in said second field memory are transferred in units of lines; and
    driver means for generating a drive pulse for causing said high-speed transfer section to transfer to said field memory, in units of lines, the charges transferred to said high-speed transfer section, and for successively generating the discharge field shift pulse and the first and second signal read field shift pulses at equal time intervals, such that a light storage time in said photosensitive section, between generation of the discharge field shift pulse and generation of the first signal read field shift pulse, coincides with a light storage time, also in said photosensitive section, between generation of the first signal read field shift pulse and generation of the second signal read field shift pulse, the signal which corresponds to a one-field in said high-speed transfer section being transferred to each of said first and second field memories, in accordance with the drive pulse between said first and second signal read field shift pulses, and the drive pulse supplied immediately after the second signal read field shift pulse.

6. The solid-state imaging device according to claim 5, wherein the discharge field shift pulse is a pulse for eliminating the charges stored in said photosensitive section, the first signal read field shift pulse is a pulse for reading a signal of a first field, and the second signal read field shift pulse is a pulse for reading a signal of a second field.

7. The solid-state imaging device according to claim 6, wherein the first field is an odd-numbered field and the second field is an even-numbered field.

8. The solid-state imaging device according to claim 6, wherein said driver means generates a drive pulse for causing said high-speed transfer section to transfer to said field memory, in units of liens, the charges which have been transferred to said high-speed transfer section, and outputs each of the field shift pulses by superposing each of the field shift pulses on the drive pulse.

9. A method of realizing a high-speed shutter function in a solid-state imaging device, comprising:
- a first step of supplying a discharge field shift pulse for discharging charges stored in accordance with an amount of received light and a period of time during which the light is received;
- a second step of supplying a first signal read field shift pulse;
- a third step of storing charges, which are stored after the first step, in a first storage means in response to the first signal read field shift pulse;
- a fourth step of supplying a second signal read field shift pulse, the second signal read field shift pulse being supplied at a timing such that a time interval between supply of the discharge field shift pulse and supply of the first signal real field shift pulse coincides with a time interval between supply of the first signal read field shift pulse and supply of the second signal read field shift pulse;
- a fifth step of storing charges, which are stored after the third step, in a second storage means, in response to the second signal read field shift pulse;
- a sixth step of transferring the charges, which are stored in said first storage means in the third step, in units of lines;
- a seventh step of storing, in said first storage means, upon completion of the sixth step, the charges which were stored in said second storage means in the fifth step; and
- an eighth step of transferring, in units of lines, the charge which were stored in said first storage means in the seventh step, the first to eighth steps being performed in a one-frame period.

10. The method according to claim 9, wherein said solid-state imaging device comprises a photosensitive section for storing charges corresponding to an amount of received light and a period of time during which the light is received; a high-speed transfer section to which the charges stored in said photosensitive section are simultaneously transferred in response to the field shift pulse; a field memory to which are transferred, in units of liens and at a high speed, the charges transferred to said high-speed transfer section, said field memory storing the transferred charges; and a line transfer section to which the charges stored in said field memory are transferred in unit of lines, said first storage means being said field memory and said second storage means being said high-speed transfer section.

11. The method according to claim 10, wherein
the first step is the step of supplying the discharge field shift pulse for discharging charges stored in said photosensitive section,
the second step is the step of supplying the first signal read field shift pulse,
the third step is the step of simultaneously transferring, in units of liens, the storage charges in said photosensitive section to said high-speed transfer section, in response to the first signal read field shift pulse, and transferring the charges from said high-speed transfer section to said field memory,
the fourth step is the step of supplying the second signal read field shift pulse,
the fifth step is the step of simultaneously transferring the storage charges in said photosensitive section to said high-speed transfer section, in response to the second signal read field shift pulse,
the sixth step is the step of causing said line transfer section to transfer, in units of liens, the charges stored in said field memory,
the seventh step is the step of transferring, in units of lines and at a high speed, the charges from said high-speed transfer section to said field memory, upon completion of transfer by said line transfer section, and
the eighth step is the step of causing said line transfer section to transfer, in units of lines, the charges stored in said field memory.

12. The method according to claim 9, wherein said solid-state imaging device comprises a photosensitive section for storing charges corresponding to an amount of received light and a period of time during which the light is received; a high-speed transfer section to which the charges stored in said photosensitive section are simultaneously transferred in response to a field shift pulse; a first field memory to which are transferred, in units of liens and at a high speed, the charges transferred to said high-speed transfer section, said first field memory storing the transferred charges; a second field memory to which the charges stored in said first field memory are transferred in units of lines and at a high speed, said second field memory storing the transferred charges; and a line transfer section to which the charges stored in said second field memory are transferred in units of lines, said first storage means being said second field memory and said second storage means being said first field memory.

13. The method according to claim 12, wherein
the first step is the step of supplying the discharge field shift pulse for discharging charges stored in said photosensitive section,
the second step is the step of supplying the first signal read field shift pulse,
the third step is the step of simultaneously transferring, in units of liens, the storage charges in said photosensitive section to said high-speed transfer section, in response to the first signal read field shift pulse, and transferring the charges from said high-speed transfer section to said first field memory,
the fourth step is the step of supplying the second signal read field shift pulse,
the fifth step is the step of simultaneously transferring the storage charges in said photosensitive section to said high-speed transfer section, in response to the second signal read field shift pulse, and transferring the storage charges from said high-speed transfer section to said first field memory in units of lines at a high speed while transferring the charges, which have been stored in said first field memory, to said second field memory in units of lines at a high speed,
the sixth step is the step of causing said line transfer section to transfer, in units of liens, the charges stored in said second field memory,
the seventh step is the step of transferring, in units of liens and at a high speed, the charges from said first field memory to said second field memory, upon completion of transfer by said line transfer section, and the eighth step is the step of causing said line transfer section to transfer, in units of lines, the charges stored in said second field memory.

14. The method according to claim 9, wherein the discharge field shift pulse is a pulse for eliminating charges stored in accordance with an amount of received light and a period of time during which the light is received, the first signal read field shift pulse is a pulse for reading a signal of a first field, and the second signal read field shift pulse is a pulse for reading a signal of a second field.

15. The method according to claim 14, wherein the first field is an odd-numbered field and the second field is an even-numbered field.

* * * * *